No. 783,112.

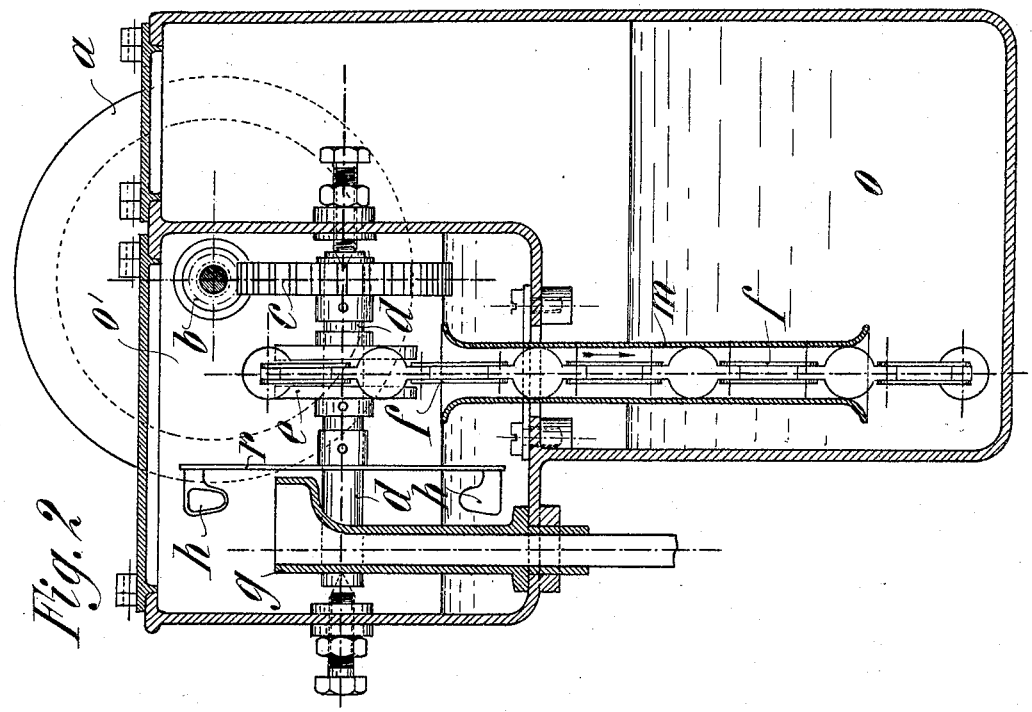
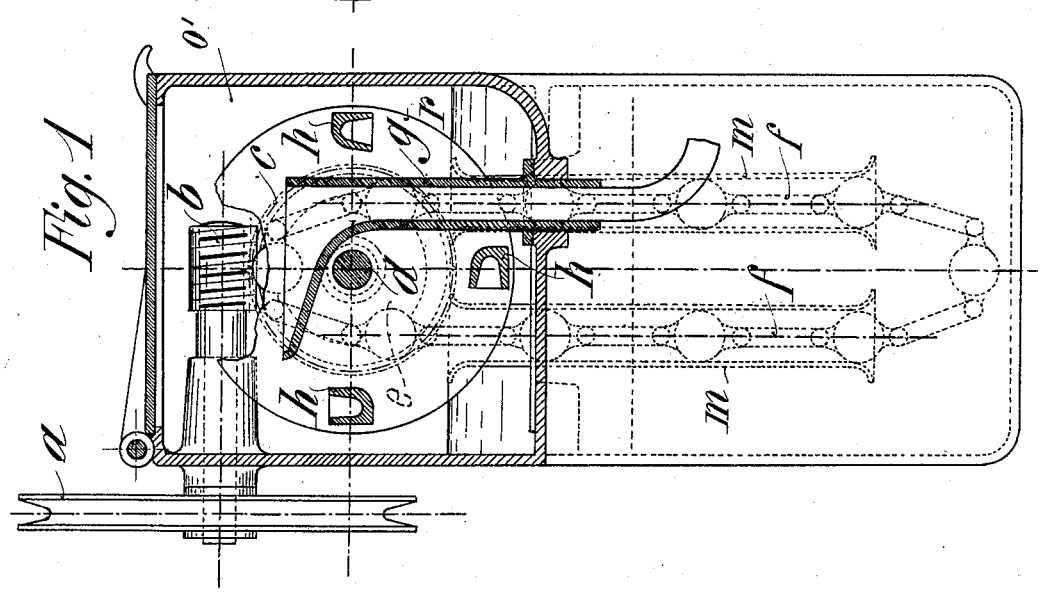

Patented February 21, 1905.

UNITED STATES PATENT OFFICE.

GIOVANNI ENRICO, OF TURIN, ITALY, ASSIGNOR TO SOCIETA FABBRICA ITALIANA AUTOMOBILI DI TORINO.

LUBRICATOR.

SPECIFICATION forming part of Letters Patent No. 783,112, dated February 21, 1905.

Application filed April 6, 1904. Serial No. 201,919.

*To all whom it may concern:*

Be it known that I, GIOVANNI ENRICO, of Turin, in the Kingdom of Italy, have invented new Improvements in Lubricators, of which the following is a full and exact description.

This invention has for its object to provide a lubricating apparatus which enables a quantity of lubricant to be supplied proportional to the number of revolutions of a shaft or other rotating body in a given time.

I will describe the invention with reference to the accompanying drawings, in which—

Figure 1 is a cross-section, and Fig. 2 a longitudinal section, of a lubricating apparatus made in accordance with the invention.

$o$ is a reservoir containing the lubricant and having at its upper part a feed-chamber $o'$ traversed by a horizontal shaft $d$, supported by two pivots attached to the walls of the chamber, and having fixed to it a worm-wheel $c$, gearing with a worm $b$, the shaft of which carries a pulley $a$, which is driven from the shaft or other rotating body to be lubricated. To the shaft $d$ is also fixed a sprocket-wheel $e$, carrying a chain $f$, consisting of balls connected by links. The two sides of the chain move with but slight friction in two tubes $m$, which communicate between the lower parts of the reservoir $o$ and chamber $o'$. The lubricant is raised by the operation of the chain $f$ from the reservoir $o$ to the chamber $o'$ through one of the tubes $m$, the amount of lubricant thus raised being slightly larger than that which is consumed, so that the level of the said lubricant in the chamber $o'$ remains level with the upper ends of the tubes $m$, the excess of the lubricant returning to the reservoir $o$ by the tube $m$, through which the descending side of the chain $f$ moves. To the shaft $d$ is also secured a wheel or disk $r$, carrying cups or buckets $h$, so arranged that as the wheel or disk $r$ rotates the said cups or buckets dip into and take up the lubricant and discharge it into the funnel of a tube $g$, which conducts the lubricant to the body to be lubricated. As the level of the lubricant in the chamber $o'$ is constant, the quantity thereof taken up and discharged by the cups or buckets $h$ is proportional to the number of revolutions of the shaft or body being lubricated.

Having particularly described and ascertained the nature of my said invention and in what manner the same is to be performed, I declare that what I claim is—

1. In a lubricating apparatus, a chamber for containing oil, a feeding device acting to elevate oil from said chamber and deliver it out of the apparatus, and means for maintaining a substantially constant level of oil in said chamber, said means acting to supply fresh oil to said chamber to take the place of that delivered.

2. In a lubricating apparatus, a chamber for containing oil, a rotary feeding device adapted to pass into the oil in said chamber and elevate it to a discharge-passage adapted to deliver it out of the apparatus, and means for maintaining a substantially constant level of oil in said chamber, said means acting to supply fresh oil to said chamber to take the place of that delivered by said discharge-passage.

3. In a lubricating apparatus, the combination of a chamber, means for delivering oil thereto, means for maintaining a substantially constant level of oil therein, a bucket-wheel adapted to elevate oil from said chamber, a discharge-pipe and means for rotating said wheel to deliver predetermined quantities of oil to said pipe.

4. In a lubricating apparatus, the combination of a reservoir, a feed-chamber, means for elevating oil from said reservoir to said chamber, means for maintaining a constant level of oil in the latter, and an elevating device adapted to pass into the oil in said feed-chamber and discharge it at a point above its level therein.

5. The combination of a reservoir $o$, a chamber $o'$, a pumping device adapted to elevate oil from said reservoir to said chamber, an overflow in said chamber adapted to return any excess of oil to the reservoir when the level tends to rise in said chamber, a wheel $r$ having buckets $h$ dipping into the oil in said chamber, and a discharge $g$ adapted to receive oil from said buckets.

In witness whereof I have hereunto set my hand in presence of two witnesses.

GIOVANNI ENRICO.

Witnesses:
MARIO CAPUCCIO, [L. S.]
GOTTARDO PIRONI. [L. S.]